US011293373B2

(12) United States Patent
Ryu et al.

(10) Patent No.: US 11,293,373 B2
(45) Date of Patent: Apr. 5, 2022

(54) CYLINDER HEAD

(71) Applicants: Hyundai Motor Company, Seoul (KR); Kia Motors Corporation, Seoul (KR)

(72) Inventors: Hyun Wook Ryu, Hwaseong-si (KR); Sa Hoon Hong, Suwon-si (KR); Eun Ho Lee, Hwaseong-si (KR); Min Kyoung Ryu, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/153,037

(22) Filed: Jan. 20, 2021

(65) Prior Publication Data

US 2022/0074365 A1 Mar. 10, 2022

(30) Foreign Application Priority Data

Sep. 4, 2020 (KR) .................. 10-2020-0113119

(51) Int. Cl.
| | |
|---|---|
| *F01P 3/20* | (2006.01) |
| *F01N 13/10* | (2010.01) |
| *F02F 1/14* | (2006.01) |
| *F02F 1/40* | (2006.01) |
| *F02F 1/16* | (2006.01) |
| *F02F 1/24* | (2006.01) |

(52) U.S. Cl.
CPC ................ *F02F 1/16* (2013.01); *F01N 13/10* (2013.01); *F01P 3/20* (2013.01); *F02F 1/14* (2013.01); *F02F 1/242* (2013.01); *F02F 1/40* (2013.01); *F01P 2060/16* (2013.01)

(58) Field of Classification Search
CPC ...... F02F 1/16; F02F 1/242; F02F 1/14; F02F 1/40; F02F 1/36; F01P 3/20; F01P 3/02; F01P 7/14; F01P 2003/024; F01P 2007/143; F01P 2060/16; F01N 13/10; F01N 3/046
See application file for complete search history.

(56) References Cited

U.S. PATENT DOCUMENTS

| | | | | |
|---|---|---|---|---|
| 9,562,493 | B2 * | 2/2017 | Wakiya ..................... | F01P 3/02 |
| 2013/0340692 | A1 * | 12/2013 | Slike ......................... | F02F 1/40 |
| | | | | 123/41.31 |

(Continued)

FOREIGN PATENT DOCUMENTS

KR 2014-0078437 A 6/2014

*Primary Examiner* — Grant Moubry
(74) *Attorney, Agent, or Firm* — Morgan, Lewis & Bockius LLP

(57) ABSTRACT

A cylinder head configured for dividing coolant introduced thereinto to a combustion chamber side and an exhaust manifold side to increase the amount of coolant introduced to the combustion chamber side, improving cooling performance, may include a head water jacket having a combustion chamber coolant inlet, through which coolant is introduced from a cylinder block to a combustion chamber side, and an exhaust coolant inlet, through which the coolant is introduced from the cylinder block to an exhaust manifold side, the combustion chamber coolant inlet and the exhaust coolant inlet being separated from each other such that the coolant introduced through the combustion chamber coolant inlet flows to the combustion chamber side in an expanded state.

10 Claims, 5 Drawing Sheets

(56) References Cited

U.S. PATENT DOCUMENTS

| | | | |
|---|---|---|---|
| 2014/0137818 A1* | 5/2014 | Ko | F02F 1/38 123/41.82 R |
| 2016/0146150 A1* | 5/2016 | Song | F02F 1/243 60/323 |
| 2020/0248646 A1* | 8/2020 | Knollmayr | F01P 3/02 |

* cited by examiner

CYLINDER HEAD

CROSS-REFERENCE TO RELATED APPLICATION

The present application claims priority to Korean Patent Application No. 10-2020-0113119, filed on Sep. 4, 2020, the entire contents of which is incorporated herein for all purposes by this reference.

BACKGROUND OF THE PRESENT INVENTION

Field of the Invention

The present invention relates to a cylinder head configured for dividing coolant introduced thereinto to a combustion chamber side and an exhaust manifold side to increase the amount of coolant introduced to the combustion chamber side, improving cooling performance.

Description of Related Art

When an engine is operated, the temperature of the engine is greatly increased due to combustion of mixed gas. To cool the engine to a temperature suitable to operate the engine, a water jacket, which is a space in which coolant flows, is formed in a cylinder block and a cylinder head.

That is, coolant absorbing heat from the engine while circulating in the water jacket is introduced to a radiator, in which heat exchange is performed, is introduced from the radiator to the water jacket to cool the cylinder block and the cylinder head, and is introduced to the radiator.

In the case in which a head water jacket is formed in the cylinder head, coolant introduced through a coolant inlet is distributed to a combustion chamber side and an exhaust manifold side thereof.

As a result, it is difficult to intensively supply coolant to the combustion chamber side thereof. Furthermore, flow speed of the coolant is reduced, whereby temperature of the coolant is rapidly increased.

Consequently, the temperature of a metal surface of a combustion chamber of the cylinder head is locally increased, whereby knocking occurs, which leads to unstable combustion.

The matters included in the present section are merely for enhancement of understanding of the general background of the invention and may not be taken as an acknowledgment or any form of suggestion that the matters form the related art already known to a person skilled in the art.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a cylinder head configured for dividing coolant introduced thereinto to a combustion chamber side and an exhaust manifold side to increase the amount of coolant introduced to the combustion chamber side, improving cooling performance.

In accordance with various aspects of the present invention, the above and other objects may be accomplished by the provision of a cylinder head including a head water jacket having a combustion chamber coolant inlet, through which coolant is introduced from a cylinder block to a combustion chamber side, and an exhaust coolant inlet, through which the coolant is introduced from the cylinder block to an exhaust manifold side, the combustion chamber coolant inlet and the exhaust coolant inlet being separated from each other such that the coolant introduced through the combustion chamber coolant inlet flows to the combustion chamber side in an expanded state.

The head water jacket may include a lower jacket formed in a shape configured to cover an upper portion of a combustion chamber, the combustion chamber coolant inlet being formed in the lower jacket for each cylinder, a side jacket formed at the exhaust manifold side, the exhaust coolant inlet being formed in an end portion of the side jacket, and an upper jacket formed above the lower jacket such that the coolant from the lower jacket and the side jacket flows to the upper jacket.

A flow channel between the combustion chamber coolant inlet and the exhaust coolant inlet may be formed in a separated shape.

The combustion chamber coolant inlet may be formed in the end portion of the lower jacket that faces the side jacket, and the exhaust coolant inlet may be formed in the end portion of the side jacket that faces the lower jacket.

A region between spark plug holes of cylinders may be formed as an open shape in the lower jacket.

A coolant outlet may be formed in the end portion of one side of the cylinder head, and the exhaust coolant inlet may be formed in the portion of the side jacket which is located relatively distant from the coolant outlet with respect to the one side of the cylinder head.

A side connection channel may be formed between the side jacket and the lower jacket located relatively close to the coolant outlet, and the side connection channel may be formed to have a predetermined flow sectional area or less.

A first rib may be formed in the upper jacket to block a region between each cylinder and a cylinder adjacent thereto.

The first rib may be formed in a region of the upper jacket between each cylinder and the cylinder adjacent thereto at a portion of the upper jacket extending from an exhaust port hole to a spark plug hole.

An end portion of the first rib extending to the spark plug hole may be formed to be inclined in a direction opposite a direction toward the coolant outlet with respect to a longitudinal axis of the upper jacket.

A second rib may be formed on a portion of the upper jacket extending from the exhaust manifold side to the combustion chamber side, the second rib having a shape configured to block flow of coolant toward a coolant outlet.

A portion of a flow channel toward a coolant outlet may be formed as a closed shape at a region of the upper jacket between the exhaust manifold side and the combustion chamber side thereof.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
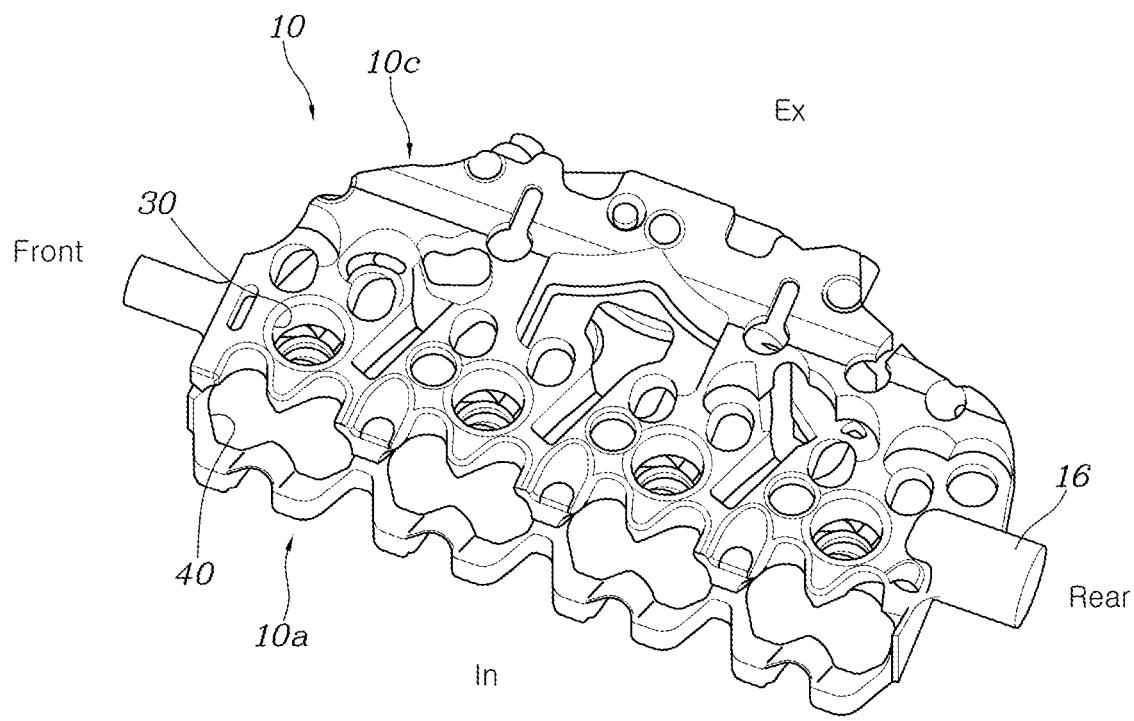
FIG. 1 is a view showing the shape of a head water jacket according to various exemplary embodiments of the present invention formed through overall modeling thereof.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary various exemplary embodiments of the present invention will be described in detail with reference to the accompanying drawings.

Figure 2:
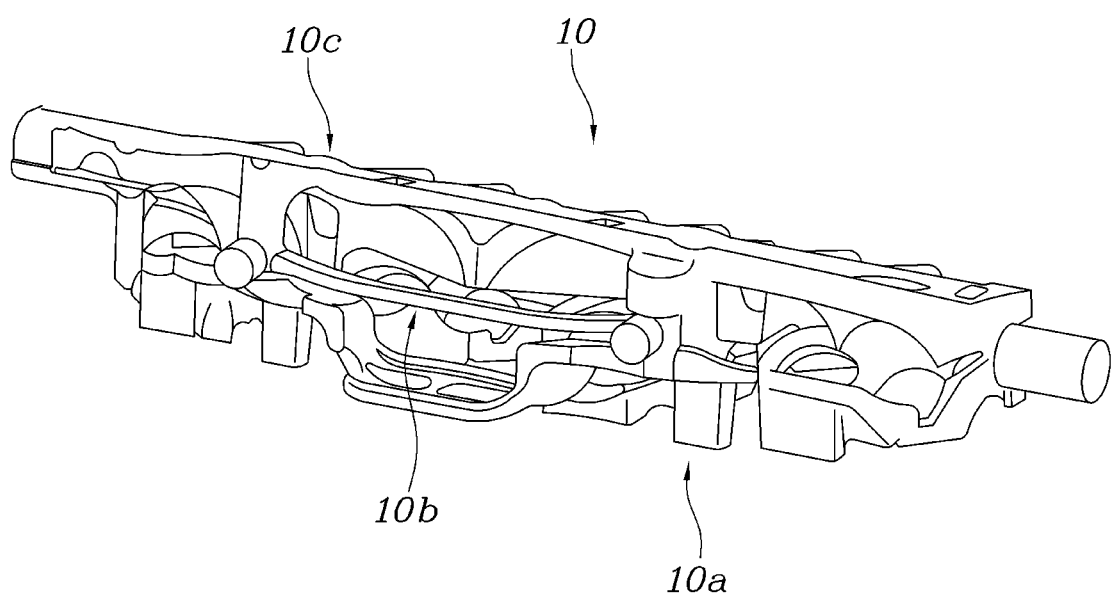
FIG. 2 is a view showing the head water jacket of FIG. 1 at an exhaust manifold side.
Figure 3:
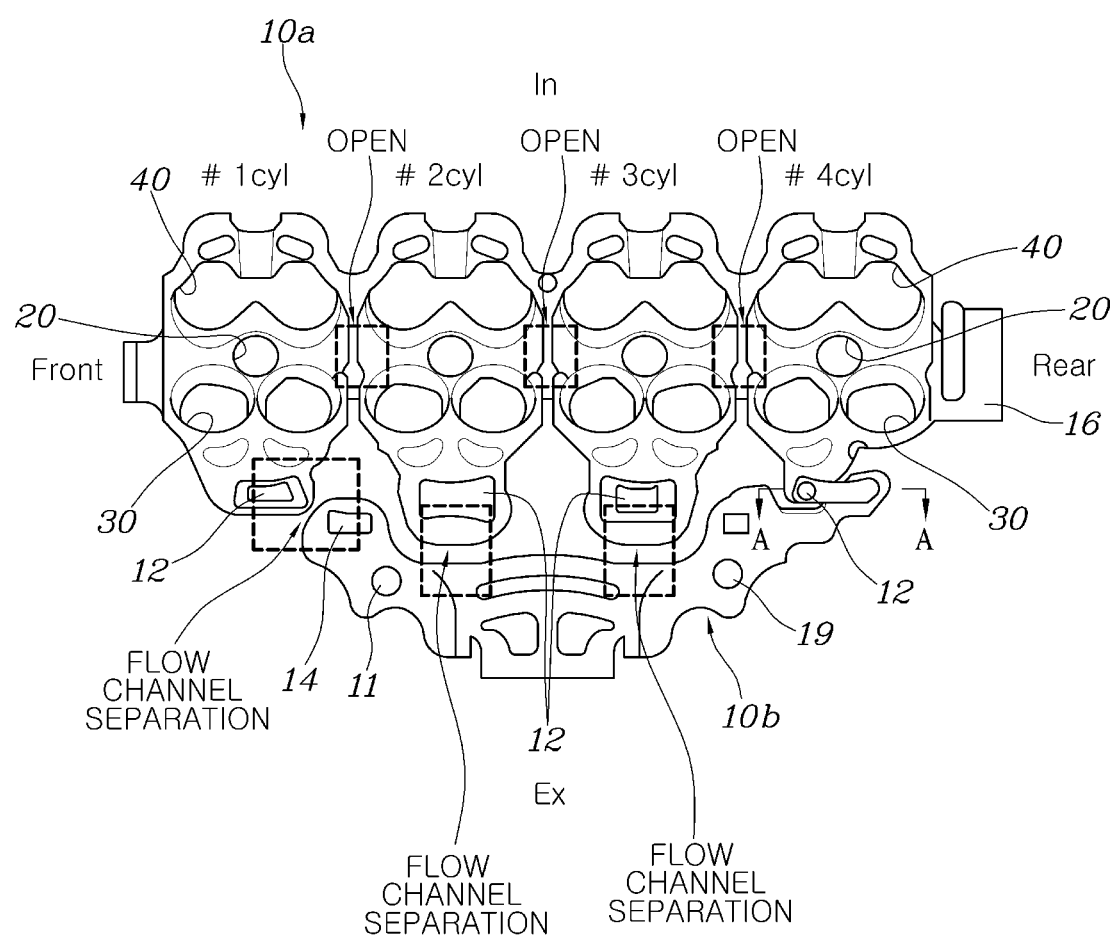
FIG. 3 is a view showing the shape of a lower jacket and a side jacket of the head water jacket of FIG. 1 when viewed from below.

FIG. 1 is a view showing the shape of a head water jacket 10 according to various exemplary embodiments of the present invention formed through overall modeling thereof, FIG. 2 is a view showing the head water jacket 10 of FIG. 1 at an exhaust manifold side Ex, and FIG. 3 is a view showing the shape of a lower jacket 10a and a side jacket 10b of the head water jacket 10 of FIG. 1 when viewed from below.

Referring to the figures, a cylinder head applicable to various exemplary embodiments of the present invention may be an exhaust manifold integrated cylinder head and may be applicable to a 4-cylinder engine in which four cylinders are connected to each other in series.

The head water jacket 10, which forms a coolant flow channel, is formed in the cylinder head. Coolant from a block water jacket 70 of a cylinder block is introduced into the head water jacket 10.

A coolant inlet, through which the coolant from the cylinder block is introduced, is formed in the cylinder head. The coolant inlet may be formed for each cylinder.

Meanwhile, the cylinder head according to various exemplary embodiments of the present invention includes a head water jacket 10 having a combustion chamber coolant inlet 12, through which coolant is introduced from the cylinder block to a combustion chamber side, and an exhaust coolant inlet 14, through which coolant is introduced from the cylinder block to the exhaust manifold side Ex, the combustion chamber coolant inlet 12 and the exhaust coolant inlet 14 being separated from each other such that the coolant introduced through the combustion chamber coolant inlet 12 flows to the combustion chamber side in an expanded state.

Figure 4:
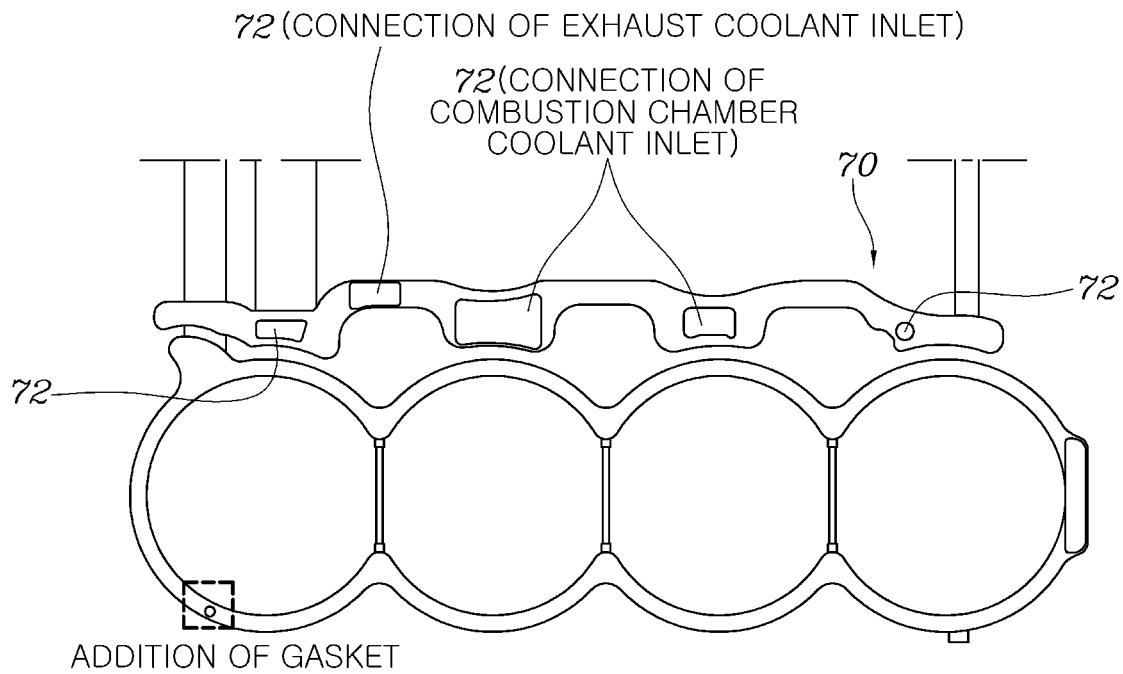
FIG. 4 is a view showing a block water jacket of a cylinder block connected to the head water jacket according to various exemplary embodiments of the present invention.

Referring to FIG. 4, a block coolant outlet 72 is formed in the block water jacket 70 of the cylinder block. The block coolant outlet 72 is connected to the coolant inlet of the cylinder head such that the coolant is introduced into the head water jacket 10. At the instant time, flow sectional area of the coolant inlet may be adjusted by a gasket mounted between the cylinder block and the cylinder head.

That is, the combustion chamber coolant inlet 12 and the exhaust coolant inlet 14, which are formed such that the coolant is introduced into the head water jacket 10 therethrough, are formed to be separated from each other. Consequently, the coolant introduced through the combustion chamber coolant inlet 12 flows to the combustion chamber side in an expanded state without being distributed to the exhaust manifold side thereof.

As a result, the flow rate of the coolant introduced to the combustion chamber side is increased, whereby the temperature of a metal surface of a combustion chamber is effectively reduced, and therefore cooling performance is improved. Furthermore, knocking is inhibited, whereby combustion stability is improved.

The head water jacket 10 may be mainly divided into a lower jacket 10a, a side jacket 10b, and an upper jacket 10c.

Referring to FIG. 1, FIG. 2, and FIG. 3, the head water jacket 10 includes a lower jacket 10a formed in a shape configured to cover the upper portion of the combustion chamber, the combustion chamber coolant inlet 12 being formed in the lower jacket 10a for each cylinder, a side jacket 10b formed at the exhaust manifold side Ex, the exhaust coolant inlet 14 being formed in an end portion of the side jacket 10b, and an upper jacket 10c formed above the lower jacket 10a such that coolant from the lower jacket 10a and the side jacket 10b flows to the upper jacket 10c.

For example, the combustion chamber coolant inlet 12 is formed in the portion of the lower jacket 10a corresponding to each of the first, second, third, and fourth cylinders, and the exhaust coolant inlet 14 is formed in the portion of the side jacket 10b separated from the lower jacket 10a.

Consequently, the amount of coolant that flows to the combustion chamber for each cylinder is increased, whereby a coolant flow rate deviation between the cylinders is reduced, and therefore cooling performance of the cylinder head is improved.

Referring to FIG. 3, a flow channel between the combustion chamber coolant inlet 12 and the exhaust coolant inlet 14 is formed in a separated shape.

For example, the combustion chamber coolant inlet 12 is formed in the end portion of the lower jacket 10a that faces the side jacket 10b in an exhaust port hole 30 of each cylinder.

The exhaust coolant inlet 14 is formed in the end portion of the side jacket 10b that faces the lower jacket 10a. The exhaust coolant inlet 14 and the combustion chamber coolant inlet 12 are formed adjacent to each other.

Since a region between the portion of the side jacket 10*b* in which the exhaust coolant inlet 14 is formed and the portion of the lower jacket 10*a* in which the combustion chamber coolant inlet 12 is formed has a separated shape, however, the flow channel between the combustion chamber coolant inlet 12 and the exhaust coolant inlet 14 is formed in a separated shape.

Meanwhile, referring to FIG. 3, a region between spark plug holes 20 of the cylinders may be formed as an open shape in the lower jacket 10*a*.

That is, coolant introduced from the combustion chamber coolant inlet 12 formed for each cylinder to the combustion chamber flows to main portions of the combustion chamber including the spark plug hole 20, and the coolant introduced to each combustion chamber side flows to a coolant outlet 16 through the open region between the spark plug holes 20.

Consequently, overall temperature of the combustion chamber including the circumference of the spark plug hole 20 is reduced. Furthermore, the maximum temperature of the combustion chamber is reduced, whereby engine cooling performance is improved.

The coolant outlet 16 is formed in the end portion of one side of the cylinder head.

The exhaust coolant inlet 14 is formed in the portion of the side jacket 10*b* which is located relatively distant from the coolant outlet 16.

For example, the exhaust coolant inlet 14 is located between the combustion chamber coolant inlet 12 formed in the first cylinder and the combustion chamber coolant inlet 12 formed in the second cylinder. In the figures, the exhaust coolant inlet 14 is formed in the front end portion, and the coolant outlet 16 is formed in the rear end portion.

Consequently, coolant introduced to the exhaust coolant inlet 14 flows from the front side to the rear side along the side jacket 10*b*, whereby the exhaust manifold side Ex is cooled.

For reference, flow channels 11 and 19 are formed at a plurality of spots in the middle portion of the side jacket 10*b* to be connected to the upper jacket 10*c*, whereby a portion of the coolant flowing into the side jacket 10*b* may move to the upper jacket 10*c*.

Figure 5:
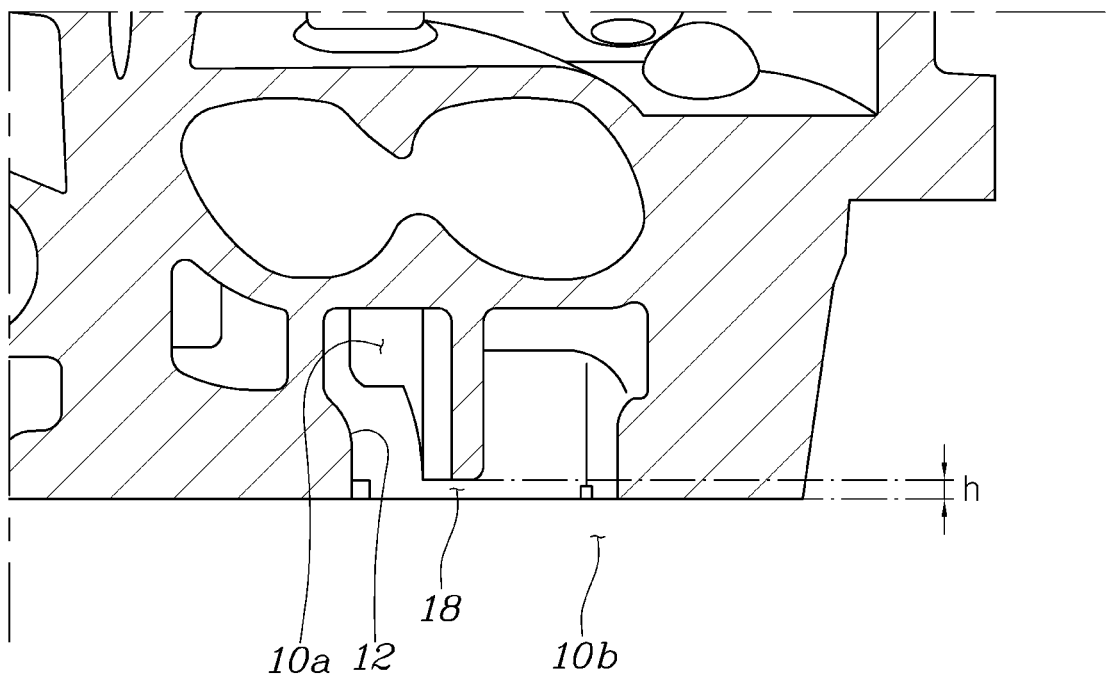
FIG. 5 is a sectional view taken along line A-A of FIG. 3.

FIG. 5 is a sectional view taken along line A-A of FIG. 3. A side connection channel 18 is formed between the side jacket 10*b* and the lower jacket 10*a* located relatively close to the coolant outlet 16. The side connection channel 18 is formed to have a predetermined flow sectional area or less.

To the present end, the side connection channel 18 may be formed to have a predetermined height h or less. For reference, the side connection channel 18 may be formed to have a height h of about 3 mm. This is realized in a mold for forming the cylinder head.

That is, for the lower jacket 10*a* and the side jacket 10*b*, the coolant inlets are formed to be separated from each other. At the portion of the combustion chamber coolant inlet 12 formed in the fourth cylinder, however, the side connection channel 18 is minutely connected between the side jacket 10*b* and the lower jacket 10*a*.

Consequently, coolant in the side jacket 10*b* is introduced into the lower jacket 10*a* through the side connection channel 18 while flowing from the front side to the rear side, whereby cooling performance at the exhaust manifold side is also improved without reducing the amount of coolant that flows to the combustion chamber side thereof.

Figure 6:
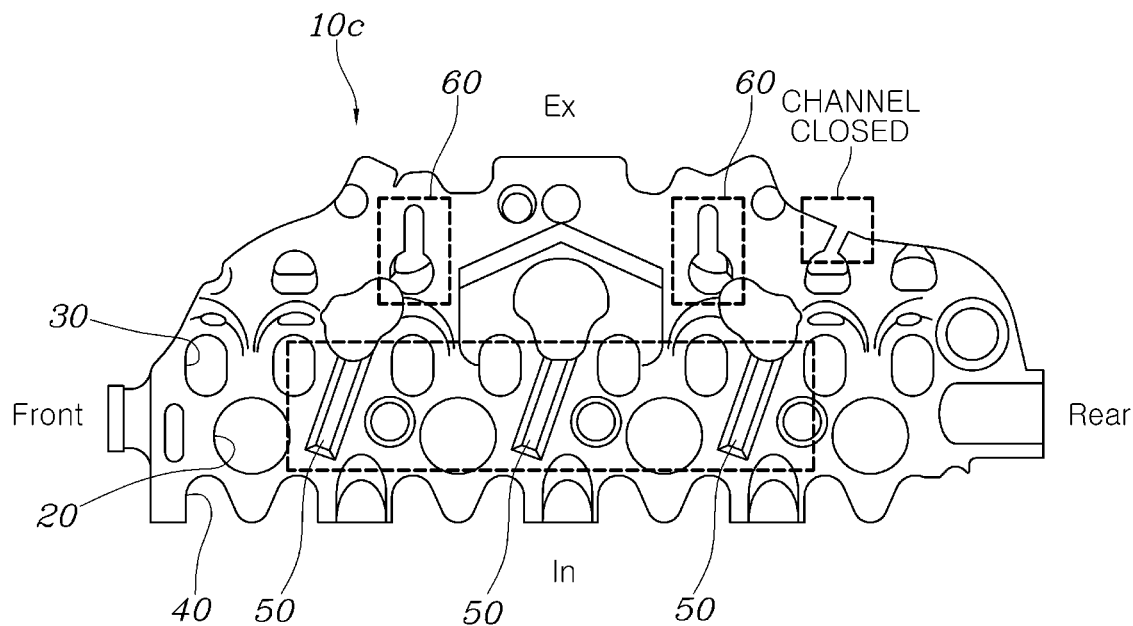
FIG. 6 is a view showing the shape of an upper jacket of the head water jacket of FIG. 1 when viewed from above.

Meanwhile, FIG. 6 is a view showing the shape of the upper jacket 10*c* of the head water jacket 10 of FIG. 1 when viewed from above.

Referring to the figure, a first rib 50 is formed in the upper jacket 10*c* to block a region between each cylinder and a cylinder adjacent thereto.

Since the first rib 50 is formed in the upper jacket 10*c* between each cylinder and a cylinder adjacent thereto, flow resistance of the coolant in the upper jacket 10*c* is increased. As a result, the flow rate of coolant introduced from the lower jacket 10*a* to the upper jacket 10*c* is reduced, whereby the flow rate of coolant in the lower jacket 10*a* is further increased, and therefore cooling of the combustion chamber is improved.

Furthermore, the first rib 50 may be formed in a region of the upper jacket between each cylinder and a cylinder adjacent thereto at the portion extending from the exhaust port hole 30 to the spark plug hole 20. Unexplained reference numeral 40 indicates an intake port hole.

That is, the first rib 50 is formed to extend over the center portion of the spark plug hole 20, whereby coolant in the upper jacket 10*c* intensively flows to the combustion chamber.

Furthermore, the end portion of the first rib 50 extending to the spark plug hole 20 may be formed to be inclined in a direction opposite to the direction toward the coolant outlet 16.

That is, the first rib 50 is formed obliquely between each cylinder and a cylinder adjacent thereto, whereby the flow direction of the coolant in the upper jacket 10*c* is guided in a direction toward the combustion chamber of each cylinder. As a result, cross flow in which coolant flows from the exhaust manifold side Ex to an intake manifold side In is realized, whereby the flow of coolant to the combustion chamber is improved.

Furthermore, a second rib 60 having a shape configured to block the flow of coolant toward the coolant outlet 16 may be formed at a plurality of spots on the portion of the upper jacket 10*c* extending from the exhaust manifold side Ex to the combustion chamber side thereof.

For example, the second rib 60 may be formed on the upper jacket 10 in a longitudinal direction extending from the exhaust manifold to the combustion chamber.

Conventionally, for the coolant from the upper jacket 10*c*, the flow rate of the coolant directly flowing toward the coolant outlet 16 is greater than the flow rate of the coolant introduced to the combustion chamber of each cylinder, whereby cooling of the combustion chamber is not properly performed.

In various exemplary embodiments of the present invention, however, most of the coolant introduced into the upper jacket 10*c* is guided to the combustion chamber side by the second ribs 60, whereby a phenomenon in which the coolant directly flows to the coolant outlet 16 is prevented. Consequently, the coolant is uniformly distributed to the respective cylinders, whereby the amount of coolant that flows is increased.

Furthermore, a portion of the flow channel toward the coolant outlet 16 may be formed as a closed shape at the region of the upper jacket 10*c* between the exhaust manifold side Ex and the combustion chamber side thereof.

For example, a portion of the flow channel in the upper jacket 10*c* extending from the exhaust manifold side Ex to the coolant outlet 16 is formed as a closed shape, whereby a phenomenon in which the coolant introduced from the exhaust manifold side Ex to the upper jacket 10*c* directly flows to the coolant outlet 16 is prevented.

Figure 7:
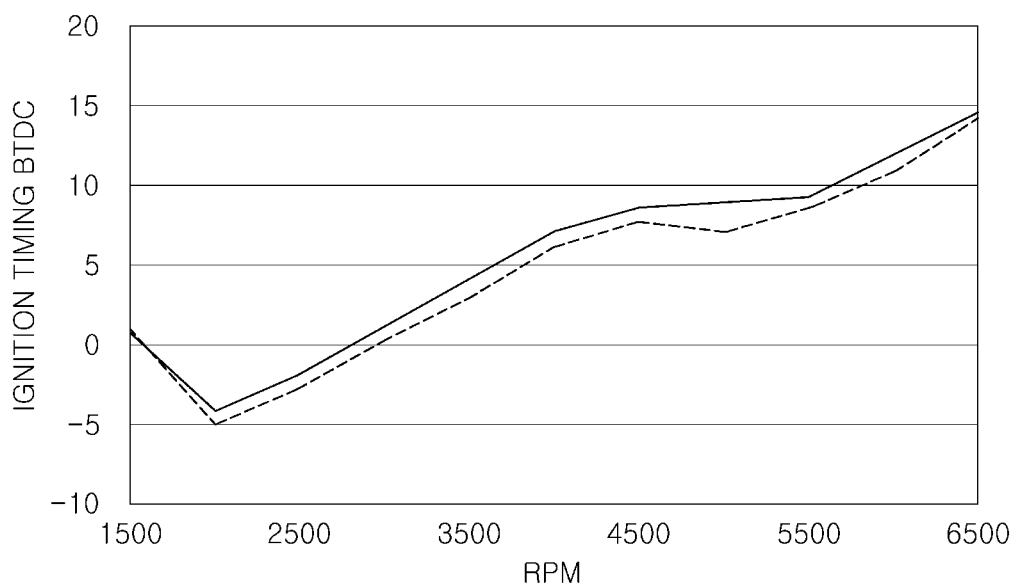
FIG. 7 is a view showing, for comparison, ignition timing changes before and after application of the present invention.
Figure 8:
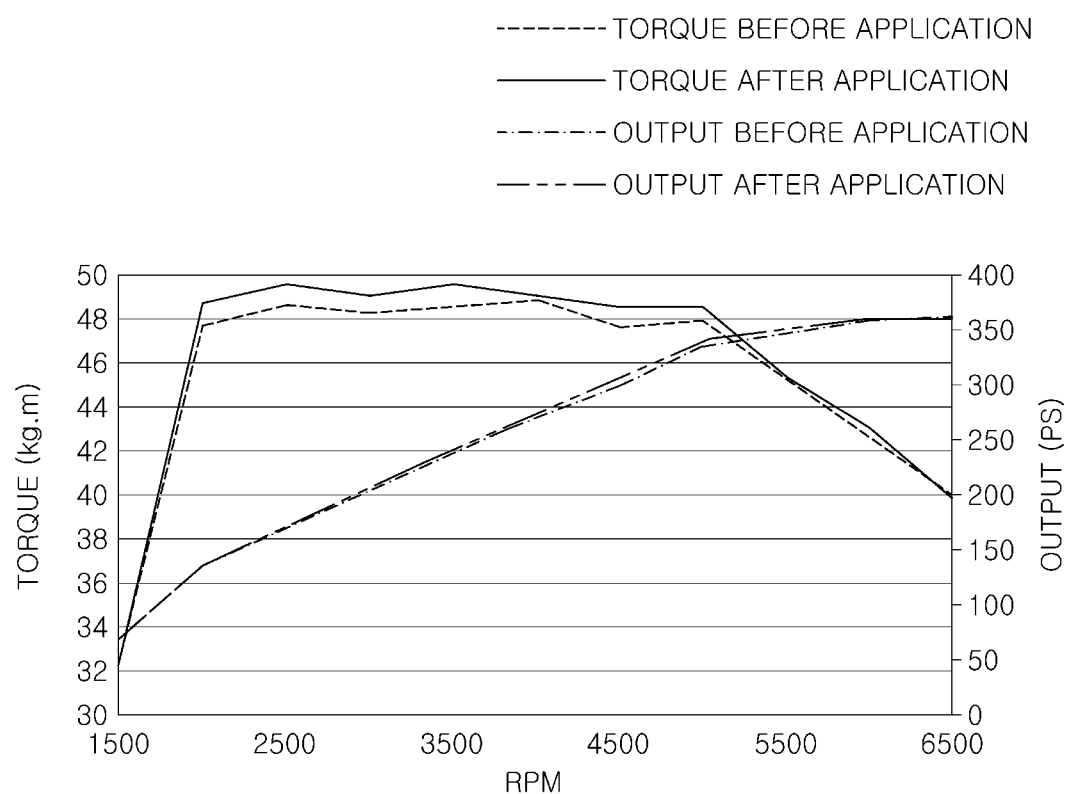
FIG. 8 is a view showing, for comparison, torque and output changes before and after application of the present invention.

Meanwhile, FIG. 7 is a view showing, for comparison, ignition timing changes before and after application of the present invention, and FIG. 8 is a view showing, for comparison, torque and output changes before and after application of the present invention.

Referring to the figures, in the case in which the construction of separating the coolant inlets from each other is applied in accordance with various aspects of the present invention, combustion chamber cooling performance is improved and knocking is inhibited, compared to before application. It may be seen that it is possible to advance ignition timing by 1.5 degrees or more. Furthermore, it may be seen that engine torque is increased by 7 Nm or more within a specific engine revolution range (2500 to 5000 rpm), whereby engine driving performance is improved.

In various exemplary embodiments of the present invention, as described above, the combustion chamber coolant inlet 12 and the exhaust coolant inlet 14 are formed in the head water jacket 10 to be separated from each other, whereby the coolant introduced through the combustion chamber coolant inlet 12 flows to the combustion chamber side in an expanded state without being distributed to the exhaust manifold side thereof.

Consequently, the flow rate of the coolant introduced to the combustion chamber side is increased, whereby the temperature of the metal surface of the combustion chamber is effectively reduced, and therefore cooling performance is improved. Furthermore, knocking is inhibited, whereby combustion stability is improved.

As is apparent from the above description, the combustion chamber coolant inlet and the exhaust coolant inlet are formed in the head water jacket to be separated from each other, whereby the coolant introduced through the combustion chamber coolant inlet flows to the combustion chamber side in an expanded state without being distributed to the exhaust manifold side thereof. Consequently, the flow rate of the coolant introduced to the combustion chamber side is increased, whereby the temperature of the metal surface of the combustion chamber is effectively reduced, and therefore cooling performance is improved. Furthermore, knocking is inhibited, whereby combustion stability is improved.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A cylinder head including a head water jacket having a combustion chamber coolant inlet, through which coolant is introduced from a cylinder block to a combustion chamber side, and an exhaust coolant inlet, through which the coolant is introduced from the cylinder block to an exhaust manifold side, the combustion chamber coolant inlet and the exhaust coolant inlet being separated from each other so that the coolant introduced through the combustion chamber coolant inlet flows to the combustion chamber side in an expanded state, wherein the head water jacket comprises:
   a lower jacket formed in a shape configured to cover an upper portion of a combustion chamber, wherein the combustion chamber coolant inlet is formed in the lower jacket for each cylinder;
   a side jacket formed at the exhaust manifold side, wherein the exhaust coolant inlet is formed in an end portion of the side jacket; and
   an upper jacket formed above the lower jacket so that the coolant from the lower jacket and the side jacket flows into the upper jacket,
   wherein a flow channel for the combustion chamber coolant inlet and a flow channel for the exhaust coolant inlet are separately formed.

2. The cylinder head according to claim 1,
   wherein the combustion chamber coolant inlet is formed in an end portion of the lower jacket that faces the side jacket, and
   wherein the exhaust coolant inlet is formed in an end portion of the side jacket that faces the lower jacket.

3. The cylinder head according to claim 1, wherein a region between spark plug holes of the cylinders is formed as an open shape in the lower jacket.

4. The cylinder head according to claim 1,
   wherein a coolant outlet is formed in an end portion of one side of the cylinder head, and
   wherein the exhaust coolant inlet is formed in a portion of the side jacket which is located relatively distant from the coolant outlet with respect to the one side of the cylinder head.

5. The cylinder head according to claim 4,
   wherein a side connection channel is formed between the side jacket and the lower jacket located adjacent to the coolant outlet, and
   wherein the side connection channel has a predetermined flow sectional area.

6. The cylinder head according to claim 1, wherein a first rib is formed in the upper jacket to block a region between adjacent cylinders among the cylinders.

7. The cylinder head according to claim 6, wherein the first rib is formed in a region of the upper jacket between the adjacent cylinders at a portion of the upper jacket extending from an exhaust port hole to a spark plug hole.

8. The cylinder head according to claim 7, wherein an end portion of the first rib extending to the spark plug hole is formed to be inclined in a direction opposite a direction toward the coolant outlet with respect to a longitudinal axis of the upper jacket.

9. The cylinder head according to claim 6,
   wherein a second rib is formed on a portion of the upper jacket extending from the exhaust manifold side to the combustion chamber side, and
   wherein the second rib has a shape configured to block flow of coolant toward a coolant outlet.

10. The cylinder head according to claim 1, wherein a portion of a flow channel toward a coolant outlet is formed as a closed shape at a region of the upper jacket between the exhaust manifold side and the combustion chamber side.

* * * * *